Figure 1:
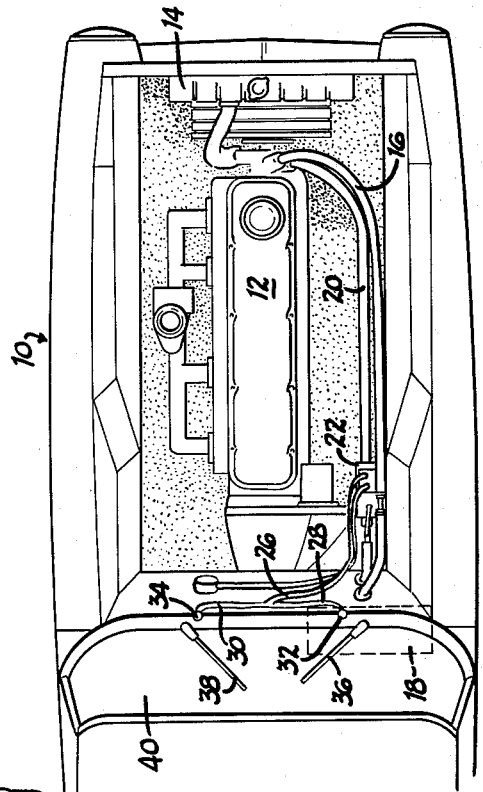

March 29, 1966  L. S. MERKLE  3,243,119
APPARATUS FOR WARMING THE FLUID OF A
VEHICLE WINDOW WASHER SYSTEM
Filed April 6, 1964

INVENTOR.
LEONARD S. MERKLE
BY
WILSON, SETTLE & CRAIG
ATTORNEYS

United States Patent Office 3,243,119
Patented Mar. 29, 1966

3,243,119
APPARATUS FOR WARMING THE FLUID OF A VEHICLE WINDOW WASHER SYSTEM
Leonard S. Merkle, 17521 Brinson, Riverview, Mich.
Filed Apr. 6, 1964, Ser. No. 357,613
2 Claims. (Cl. 237—12.3)

The present invention relates to method and apparatus for warming the fluid of a vehicle window washer system, and more particularly to method and apparatus for directly warming the fluid in the reservoir of a vehicle window washer system.

As is well known, vehicle windshield washer systems are provided on the majority of modern-day vehicles. The cleaning liquid of such systems is water. During periods of extreme cold weather, the water frequently freezes on the windshield before it can be wiped away by the wiper blades. The film of frozen water on the windshield obscures the driver's vision and creates a driving hazard usually requiring the driver to park until the film is melted by the interior windshield defrosting system.

Various attempts have been made to overcome the problem of freezing. One of the most common expedients is to mix an anti-freeze liquid into the water of the windshield washer reservoir to lower the freezing temperature of the wash mixture. This approach has not proved to be altogether satisfactory because such mixtures will still freeze at low temperatures and high vehicle speeds. Another approach has been to warm the washer fluid before it is squirted onto the windshield. To accomplish this, the hose leading from the washer reservoir has been placed in heat exchange relationship with a warm part of the vehicle power plant, such as the exhaust manifold. This procedure has resulted in a relatively high cost installation and, additionally, will not result in a sufficient degree of warming because of the very short period of time in which the washer fluid is in heat exchange relationship with the warm portion of the engine.

I propose to overcome this problem by warming the entire fluid contents of the washer reservoir by use of the hot water of the vehicle cooling system, the arrangement being such that the washer fluid is always sufficiently warm for application to the windshield without freezing, even at very low temperatures and high vehicle speeds. The structure for accomplishing this is very simple and easily incorporated into existing windshield washer designs at a minimum cost.

It is thus an object of my invention to provide a method and apparatus for heating the fluid in the fluid reservoir of a vehicle windshield washer system.

Another object of the invention is to provide structure for bleeding off a portion of the warm water of the cooling system of the vehicle and passing this warm water into and through the windshield washer reservoir in heat exchange relationship with the contents thereof.

A further object of the invention is to provide novel structure for tapping the warm water of the vehicle cooling system from the hose extending to the hot water heater within the vehicle.

A still further object of the invention is to provide a novel conduit structure for connection between the inlet and outlet tubing extending to the vehicle hot water heater, the conduit structure having a U-shaped portion which extends into the windshield washer fluid reservoir in heat exchange relation with the contents thereof.

Another object of the invention is to provide a simple and inexpensive structure for warming the windshield washer reservoir fluid.

Other objects of this invention will appear in the following description and appended claims, reference being had to the accompanying drawing forming a part of this specification wherein like reference characters designate corresponding parts in the several views.

Figure 2:
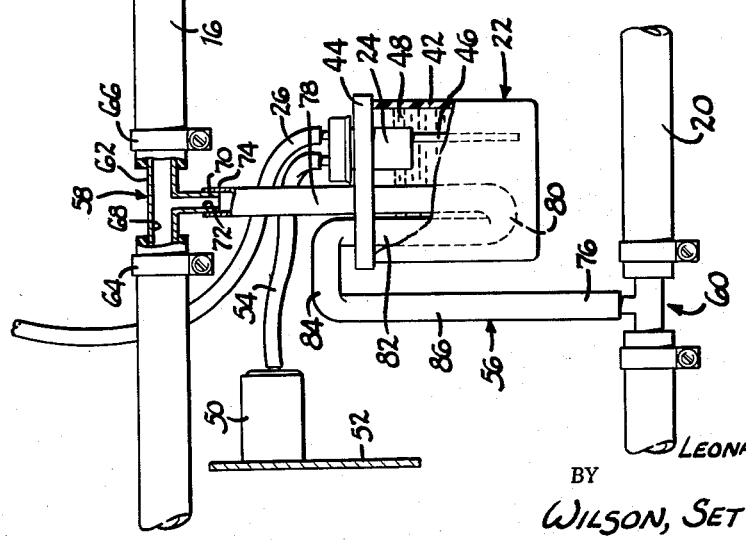

In the drawing:

FIGURE 1 is a top plan view of the front end of a conventional vehicle with hood removed illustrating the windshield washer system thereof which has incorporated therein one embodiment of my fluid reservoir heating system; and FIGURE 2 is a side elevational view of the windshield washer fluid reservoir in combination with my heating system therefor.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to FIGURE 1, a vehicle 10 is illustrated having a motor 12 and a radiator 14 which forms a reservoir for water to cool the motor. Extending from the radiator 14 is a flexible hose 16 leading to the hot water heater 18 of the vehicle. A second hose 20 leads from the heater 18 back to the radiator to thus form a complete fluid circuit through the heater. The vehicle 10 is provided with a windshield washer system comprising a fluid reservoir 22 having a pump 24 from which extends a flexible tube 26. The tube 26 has branches 28, 30, each of which terminate in a nozzle 32, 34 mounted beneath the windshield wiper blades 36, 38. The nozzles 32, 34 are aimed to direct water onto the area of the windshield 40 which is traversed by the blades 36, 38.

As best shown in FIGURE 2, the reservoir 22 comprises an open-top container 42 having a detachable cover 44. The reservoir is preferably fabricated from a plastic material for heat-insulation of the contents thereof.

The pump 24 is mounted in the cover 44 and has a tube 46 which extends therefrom to substantially the bottom of the container. The reservoir is filled with a cleaning fluid 48, which is conventionally water. The pump 24 is of the vacuum type and is actuated by means of a vacuum chamber 50 mounted on the vehicle fire wall 52. A tube 54 interconnects the vacuum chamber 50 with the pump 24.

A conduit 56 is interconnected between the hot water heater inlet and outlet hoses 16, 20. This connection is made by means of T-fittings 58, 60. Referring to the fitting 58, it will be noted that the fitting has a straight through portion 62. It will be noted that a portion of each hose 16, 20 is cut away for the reception of the fittings 58, 60. Referring to the illustrative fitting 58, it will be noted that the ends of the straight through portion 62 are received within the open ends of the hose 16. Hose clamps 64, 66 sealingly secure the fitting 58 in place. Warm water passes through the passageway 68 to the vehicle heater. Extending at right angles to the portion 62 is a portion 70 which has a relatively small diameter bleed passageway 72. The lower end of the portion 70 is pressed into the upper end 74 of the conduit 56 to thus provide sealing engagement. The conduit 56 is preferably fabricated from a metal, such as copper, having high heat exchange characteristics. The lower end 76 of the conduit 56 is secured to the fitting 60 which is mounted in return hose 20 in the same manner as is the fitting 58.

The conduit 56 has a first portion 78 which extends through an opening in the reservoir cover 44 into heat exchange relationship with the fluid 48 within the reservoir. The portion 78 extends to a point near the bottom of the reservoir. The conduit then has a reverse bend 80 and portion 82 extends upwardly and passes through an opening in the container cover 44. The portions 78, 82 thus form a U-shaped structure immersed in the cleaning fluid 48. Portions 84 and 86 extend from the portion 82 into connection with the fitting 60.

In operation of the device, a portion of the warm heating water is extracted from the hose 16 and passes through the portions 78, 82 of the conduit 56 in heat exchange relationship with the fluid 48 to warm the fluid. As will be appreciated, warm water flows through the conduit 56 as long as the vehicle engine is running. Thus, the fluid 48 is continuously heated and will eventually rise to the temperature of the warm liquid in the vehicle cooling system. The thus warmed cleaning fluid may be squirted onto the windshield 40 for cleaning purposes without immediate freezing. The windshield wiper blades 36, 38 which are, of course, operated as soon as cleaning fluid is squirted onto the windshield, effectively wipe the fluid away before it can freeze.

As is apparent, the structure necessary to incorporate my invention into a conventional windshield washer system includes only the conduit 56, fittings 58 and 60 and the clamps necessary to secure the fittings to the hoses 16, 20. The manufacturing cost of my system is further reduced by the elimination of the necessity for a valve in the conduit 56 to stop the flow of warm fluid therethrough during warm weather, fluid flow to the vehicle heater and thus through the hoses 16, 20 being discontinued during warm weather by a valve mechanism presently provided in the vehicle heater.

Having thus described my invention, I claim:

1. For use in a motor vehicle having a liquid cooling system for the motor in which the cooling liquid becomes warm as a result of heat exchange with the motor, and a window washing system including a fluid reservoir containing cleaning liquid, a conduit having a U-shaped portion having a pair of legs extending into the fluid reservoir through the top thereof in heat exchange relationship with the cleaning liquid, said conduit being connected to the liquid cooling system and bypassing a portion of the warm cooling liquid through the U-shaped portion for warming the cleaning liquid.

2. For use in a motor vehicle having a liquid cooling system for the motor in which the cooling liquid becomes warm as a result of heat exchange with the motor, a first hose for bypassing warm cooling liquid to a vehicle heater, a second hose for returning cooling liquid from the heater to the liquid cooling system, and a window washing system including a fluid reservoir containing cleaning liquid, a conduit having a U-shaped portion having a pair of legs extending into the fluid reservoir through the top thereof in heat exchange relationship with the cleaning liquid, said conduit having an inlet end connected to said first hose for receiving warm cooling liquid for passage through the U-shaped portion in heat exchange relationship with the cleaning liquid, said conduit having an outlet end connected to said second hose for returning cooling liquid to the liquid cooling system.

References Cited by the Examiner

UNITED STATES PATENTS

| | | | |
|---|---|---|---|
| 2,260,904 | 10/1941 | Horton | 237—12.3 X |
| 2,661,015 | 12/1953 | Allred et al. | 237—12.3 X |
| 3,092,325 | 6/1963 | Brown et al. | 237—12.3 |

EDWARD J. MICHAEL, *Primary Examiner.*